United States Patent [19]

Hurkmans et al.

[11] 4,319,254

[45] Mar. 9, 1982

[54] CONSTANT HEAD, MAGNETIC ACTUATED INK JET CARTRIDGE FOR USE IN AN ELECTROSTATIC INK JET PRINTER

[75] Inventors: Antoon M. Hurkmans, Brook Field Center; Douglas R. Arnoldi, Southbury; Richard A. Sloan, Jr., Danbury, all of Conn.

[73] Assignee: Burroughs Corporation, Detroit, Mich.

[21] Appl. No.: 173,048

[22] Filed: Jul. 28, 1980

[51] Int. Cl.[3] .............................................. G01D 15/16

[52] U.S. Cl. ................................................ 346/140 R

[58] Field of Search .............................. 346/140 R, 75

[56] References Cited

U.S. PATENT DOCUMENTS 3,341,859 9/1967 Adams ................................ 346/140

3,375,528 3/1968 Klavsons ............................. 346/140

*Primary Examiner*—Joseph W. Hartary

*Attorney, Agent, or Firm*—Mark P. Starr; Edward J. Feeney, Jr.

[57] ABSTRACT

A constant head magnetic actuated ink jet cartridge is disclosed wherein a magnetically actuated piston is utilized to raise ink over a fixed height controlling wall and thereby maintain the ink at a constant head in the area of the ink jet nozzle.

10 Claims, 6 Drawing Figures

Fig.1
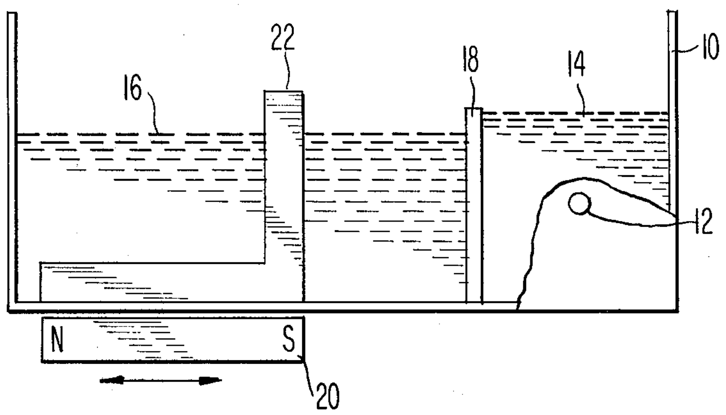
Fig.2
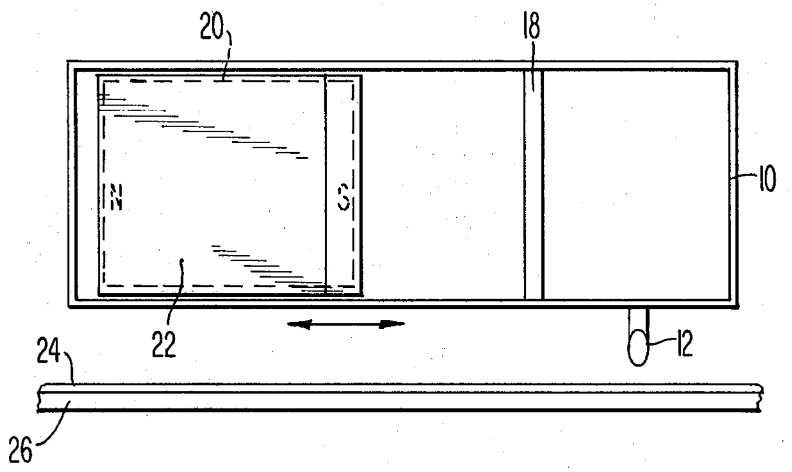
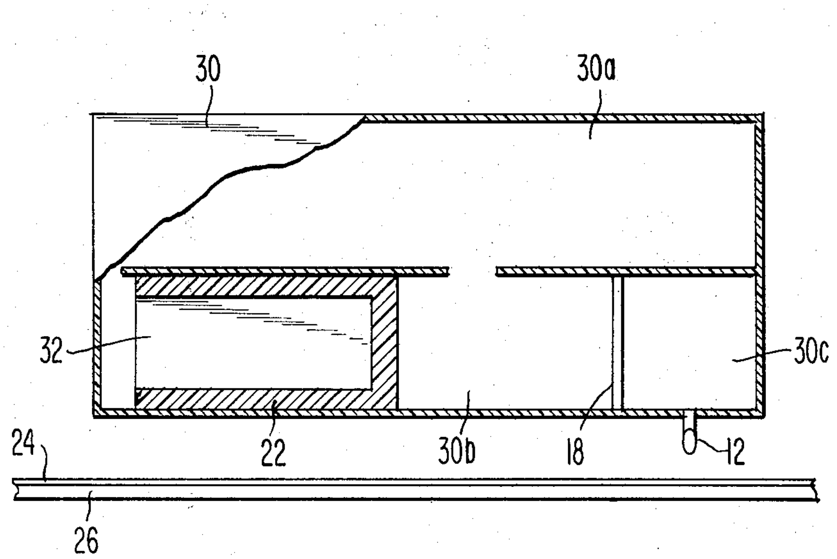
Fig.3

CONSTANT HEAD, MAGNETIC ACTUATED INK JET CARTRIDGE FOR USE IN AN ELECTROSTATIC INK JET PRINTER

BACKGROUND OF THE INVENTION

1. Field of the Invention

This invention relates, in general, to electrostatic ink jet printers and more particularly to an ink jet printer in which a replaceable cartridge is used not only as the ink supply but also as the ink jet itself.

2. Prior Art

In the past, electrostatic ink jets contained a supply of conductive ink together with an ink jet, a metallized surface upon which paper could be placed and a high voltage supply connected between the conductive ink and the metallized surface. Upon application of the voltage differential, the ink was drawn from the ink jet toward the metallized surface. Of course, since the paper was interposed between the ink jet and the metallized surface, the ink was deposited on the paper so long as the voltage was applied. Either the paper or the ink had to be moved in order to write any comprehensible information.

Many problems existed with such a system. For example, since the ink supply had to be replenished, the container had to include some opening means. Such an opening, of course, invited the entrance of dirt, which, it is readily apparent is diastrous to the passage of ink through an extremely small jet. Further, it was also found that variations in the level of ink in the container, i.e., head variations, had profound variations in the density and in the quality of the printing. There were also many other disadavantages such as the messy job of refilling the ink container which itself could cause the entrance of dirt.

BRIEF DESCRIPTION OF THE INVENTION

A. Objects

It is therefore an object of this invention to provide a disposable ink jet cartridge which contains therein not only the supply of ink, but the jet nozzle as well.

It is another object of this invention to provide such a cartridge whose internal head pressure at the jet is maintained at a constant level by external means.

It is still another object of this invention to provide a constant head pressure ink cartridge which contains means for moving the enclosed ink from one compartment to another over a wall of fixed height to thereby maintain the constant head pressure in a selected compartment within said cartridge.

It is another object of this invention to provide a multi-compartmentalized ink jet cartridge, at least one compartment of which maintains a constant head pressure of ink on the ink jet.

It is a further object of this invention to provide a multi-compartmentalized ink jet cartridge wherein at least a single compartment has a constant head pressure of ink maintained therein by external magnetic means.

These and other objects of this invention will become apparent upon studious consideration of the accompanying drawings in combination with a reading of the following detailed description of the invention.

B. SUMMARY OF THE INVENTION

In the preferred embodiment of this invention described herein, an ink jet cartridge is shown having a plurality of compartments. In one compartment there is the ink reserve, in another there is a magnetically operated piston which upon activation moves the ink in this second compartment over a wall of fixed height into a third compartment. By periodically driving this piston along the walls of the second compartment (it is actuated at the end of each line of printing) the ink in the third compartment is maintained at a constant head pressure. It is from this third compartment that the ink jet nozzle is supplied with ink.

DESCRIPTION OF THE DRAWINGS

FIG. 1 is a pictorial diagram of the front view illustrating the basic concept showing the internal piston and the external magnet for moving the piston.

FIG. 2 is a top view of a further pictorial diagram showing the same concept but illustrating the movement of the cartridge with respect to a fixed magnet.

FIG. 3 illustrates the top view of the compartmentalized cartridge showing the three sections thereof.

DETAILED DESCRIPTION OF THE INVENTION

Figure 4:
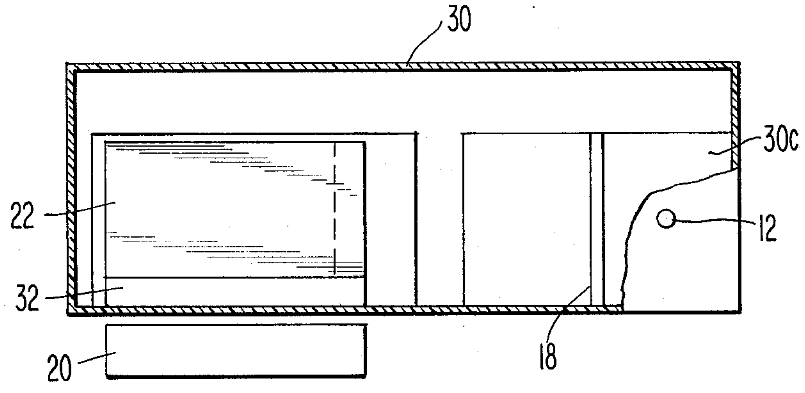
FIG. 4 is a front view of the same cartridge as that shown in FIG. 3.

Referring first to FIG. 1, there is shown an ink reservoir 10 containing a first portion containing ink at a first level 16 and a second portion containing ink at a second level 14. The portions are separated by a wall 18. A piston 22 is made of magnetic material and placed within the first portion of the ink reservoir 10. External to the reservoir 10, a bar magnet 20 is positioned so that when the bar magnet 20 is moved from left to right the piston 22 will follow. The ink in the first portion will be pushed against wall 18 and the ink level 16 that is in front of the moving piston 22 will exceed the height of wall 18 and flow into the second portion of the reservoir 10. Of course, the highest level that the ink in the second portion can reach is the height of the wall 18. Any excess will return to the first portion. By repeating this process the ink in the second portion will remain at a constant height to thereby maintain a constant head pressure upon the ink jet nozzle 12.

The pictorial display in FIG. 2 illustrates the top view of the same device that is shown in FIG. 1 except that the ink reservoir 10 is shown as a movable container. The arrows above the reservoir indicate that the container moves in both directions while the paper 24 on the metallized surface 26 remains fixed. Then, each time the container 10 moves to the left, the piston 22 is drawn to the right to cause the ink in the left-hand portion of the container to be pushed to the right and thereby exceed the height of the dividing wall 18.

FIG. 3 illustrates the top view of a compartmentalized hermetically sealed ink cartridge 30. As is shown, the cartridge is separated into three compartments. The first compartment **30*a* is the supply section and holds the ink reserve. The piston compartment 30*b* houses the plunger 22, and the compartment 30*c* is the constant head portion. As previously described, the ink level in this latter compartment 30*c* is maintained at the height of the dividing wall 18**.

By using this compartmental approach, the size of the piston 22 may be reduced as well as the size of the constant head pressure portion 30*c*.

A front view of this configuration is shown in FIG. 4 and illustrates that only the lower portion of the piston is metal. The remaining part of the piston is plastic.

Figure 5:
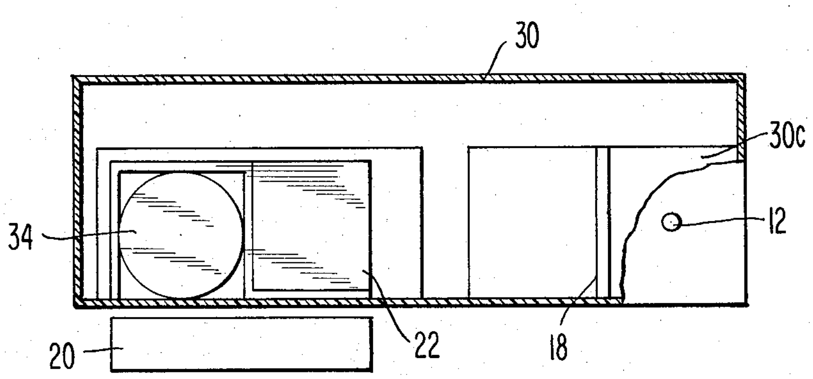
FIG. 5 illustrates another embodiment of the same inventive concept showing the magnetic portion of the piston as a ball or cylinder.
Figure 6:
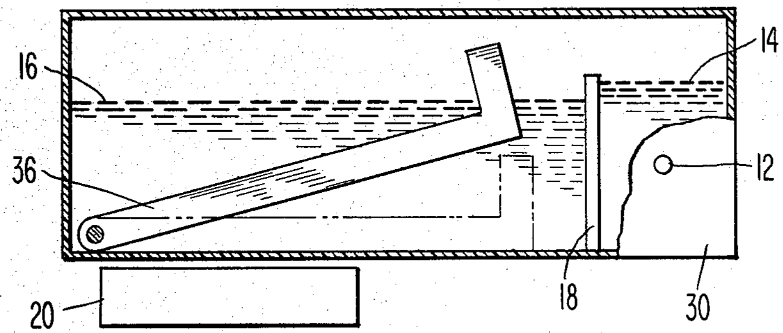
FIG. 6 illustrates a still further embodiment with the magnetic portion of the cartridge shown as a hinged plunger rather than a piston.

Alternate embodiments of the cartridge are shown in FIGS. 5 and 6. In FIG. 5, a cylinder 34 is usedrather than the flat plate of FIG. 4. The round configuration of this element allows the piston to move more easily in its compartment since it operates in a rolling rather than a sliding manner.

FIG. 6 illustrates a hinged plunger 36 approach rather than a piston. In this approach, the plunger is drawn toward the magnet 20 each time the cartridge is passed over the magnet. In this configuration, no sliding motion is necessary so that the size of the magnetic field necessary to activate the plunger may be reduced.

It will be understood from the foregoing that various changes may be made in the preferred embodiment illustrated herein, and it is intended that the foregoing material be taken as illustrative only and not in a limiting sense, the scope of the invention being defined as set forth in the following claims.

What is claimed is:

1. A constant head, magnetically actuated, disposable ink jet cartridge wherein an external magnetic force is used to activate an internal plunger to raise ink in the area of said ink jet up to a predetermined level and constantly maintain it at said level comprising:

- an ink reservoir;
- a quantity of ink contained therein;
- said ink reservoir further comprising at least a first and a second section;
- a fixed height wall means separating said first and second sections;
- a plunger-like means movably mounted in said first section;
- said plunger-like means including a magnetic portion;
- an ink jet nozzle means mounted in said second section; and
- an external magnetic means which operates in conjunction with the magnetic portion of said plunger-like means to thereby activate said plunger means when said ink reservoir is moved in appropriate relationship therewith, the activation of said plunger-like means causing the ink in said first section to exceed the fixed height of the separating wall and thereby flow into said second section, with repeated activations of said plunger-like means maintaining the ink in said second section at the fixed height of the separating wall resulting in a constant head of pressure in said second section.

2. The constant head, magnetically actuated, disposable ink jet cartridge as set forth in claim 1 wherein said magnetic portion of said plunger is a flat plate.

3. The constant head, magnetically actuated, disposable ink jet cartridge as set forth in claim 1 wherein said magnetic portion of said plunger is cylindrical in shape.

4. The constant head, magnetically actuated, disposable ink jet cartridge as set forth in claim 1 wherein said plunger operates in a slidable manner in said first section.

5. The constant head, magnetically actuated, disposable ink jet cartridge as set forth in claim 1 wherein said plunger operates in a hinged fashion in said first section.

6. A compartmentalized constant head, magnetically actuated, disposable ink jet cartridge comprising at least:

- a first section holding the ink supply;
- a second section housing a plunger;
- a third section into which an ink jet nozzle is mounted;
- flow through areas between the first and second sections;
- a wall of fixed height between said section and said third section, which wall height is less than the height of the remaining intersectional walls;
- a first magnetic means positioned on the plunger means; and
- a second magnetic means mounted externally to said ink jet cartridge but in a relative relationship with said cartridge such that motion of said cartridge in one direction causes movement of the internal plunger in the opposite direction.

7. The compartmentalized constant head, magnetically actuated, ink jet cartridge as set forth in claim 6 wherein said first magnetic means is a flat plate.

8. The compartmentalized constant head, magnetically actuated, ink jet cartridge as set forth in claim 6 wherein said first magnetic means is cylindrical in shape.

9. The compartmentalized constant head, magnetically actuated, ink jet cartridge as set forth in claim 6 wherein the plunger housed in said second section operates in a slidable manner within said second section.

10. The compartmentalized constant head, magnetically actuated, ink jet cartridge as set forth in claim 6 wherein the plunger housed in said second section operates in a hinged fashion within said second section.

* * * * *

UNITED STATES PATENT AND TRADEMARK OFFICE
CERTIFICATE OF CORRECTION

PATENT NO. : 4,319,254

DATED : March 9, 1982

INVENTOR(S) : Antoon M. Hurkmans, et al.

It is certified that error appears in the above-identified patent and that said Letters Patent are hereby corrected as shown below:

In claim 6, at column 4, line 25, change "section" to --second--.

Signed and Sealed this

*Fourth* Day of *May 1982*

[SEAL]

*Attest:*

GERALD J. MOSSINGHOFF

*Attesting Officer* *Commissioner of Patents and Trademarks*